United States Patent [19]

Namba et al.

[11] 4,438,743

[45] Mar. 27, 1984

[54] INTERNAL COMBUSTION ENGINE

[75] Inventors: Yuzuru Namba; Kenichi Aoyagi, both of Hamamatsu, Japan

[73] Assignee: Suzuki Jidosha Kogyo Kabushiki Kaisha, Shizuoka, Japan

[21] Appl. No.: 301,524

[22] Filed: Sep. 14, 1981

[30] Foreign Application Priority Data

Nov. 13, 1980 [JP] Japan .................. 55-159716

[51] Int. Cl.³ .................. F02B 31/00; F02M 35/10
[52] U.S. Cl. .................. 123/308; 123/188 M
[58] Field of Search ............ 123/52 MB, 188 M, 308, 123/432

[56] References Cited

U.S. PATENT DOCUMENTS

| | | | |
|---|---|---|---|
| 3,408,992 | 11/1968 | Von Seggern et al. | 123/188 M |
| 3,977,188 | 8/1976 | Arnaud | 123/432 |
| 4,072,134 | 2/1978 | Noguchi et al. | 123/432 |
| 4,216,748 | 8/1980 | Ichida | 123/432 |
| 4,271,802 | 6/1981 | Hori et al. | 123/432 |
| 4,300,504 | 11/1981 | Tezuka | 123/432 |

FOREIGN PATENT DOCUMENTS 54-103913  8/1979  Japan ........................ 123/308

Primary Examiner—Craig R. Feinberg
Assistant Examiner—W. R. Wolfe
Attorney, Agent, or Firm—Quaintance & Murphy

[57] ABSTRACT

An internal combustion engine having a plurality of main suction paths adapted to respectively communication with a single combustion chamber are so provided that they can be opened or closed by different suction valves and in which a plurality of sub-suction paths provided separately of the main suction paths are pointed directing to the single combustion chamber so that the gases injected therefrom during the suction stroke may be swirled in an identical circumferential direction within said identical combustion chamber.

5 Claims, 2 Drawing Figures

INTERNAL COMBUSTION ENGINE

BACKGROUND OF THE INVENTION

1. Field of the Invention

The present invention relates to an internal combustion engine which is equipped with a sub-suction path for generating a swirl (i.e., a vortex flow) of suction gases in the combustion chamber.

2. Description of the Prior Art

Recently, internal combustion engines for automobiles are required not only to clean the exhaust gas but also to improve the rate of fuel consumption. For these requirements, exhaust gas recirculation (EGR) and a lean combustion are frequently employed. In order to prevent combustion fluctuations and misfiring while satisfying both the requirements for EGR and lean combustion, it is known to increase the burning velocity.

In order to increase this burning velocity, there have been recently proposed several intake systems, in which a sub-suction path is provided separately of the main suction path and is made to inject a gas into the combustion chamber thereby to generate a swirl of the suction gases in the combustion chamber.

However, the intake system provided with that sub-suction path is still being developed.

SUMMARY OF THE INVENTION

It is, therefore, an object of the present invention to provide an internal combustion engine of the type, in which a plurality of suction valves are provided for each engine cylinder so as to improve the suction efficiency. Engines of the present invention have a plurality of suction paths (which correspond to the main intake passages of the present invention) leading from a fuel supply device which are independently opened for each cylinder. The internal combustion engine is characterized in that the number of sub-section paths and the pointing directions of the outlet ports thereof are so devised that a satisfactorily improved combustion can be ensured.

Another object of the present invention is to provide an internal combustion engine in which the main and sub-suction paths can be opened or closed by means of an identical suction valve by opening the sub-suction paths immediately upstream of the suction valves for opening or closing the main suction paths.

Still another object of the present invention is to provide an internal combustion engine in which an air-fuel mixture to be injected into the combustion chamber from the main suction path positioned downstream of a suction swirl source is more effectively pointed in the circumferential direction of the combustion chamber by directing the outlet port of the sub-suction path positioned upstream of the suction swirl source toward the open portion of such a main suction path into the combustion chamber as is positioned downstream of the suction swirl source.

A further object of the present invention is to provide an internal combustion engine, in which the swirl of the suction gas is more effectively generated by directing the outlet port of the sub-suction path positioned upstream of the suction swirl source toward the outlet port of the sub-suction path positioned downstream of the suction swirl source.

DESCRIPTION OF THE PREFERRED EMBODIMENT

Figure 1:
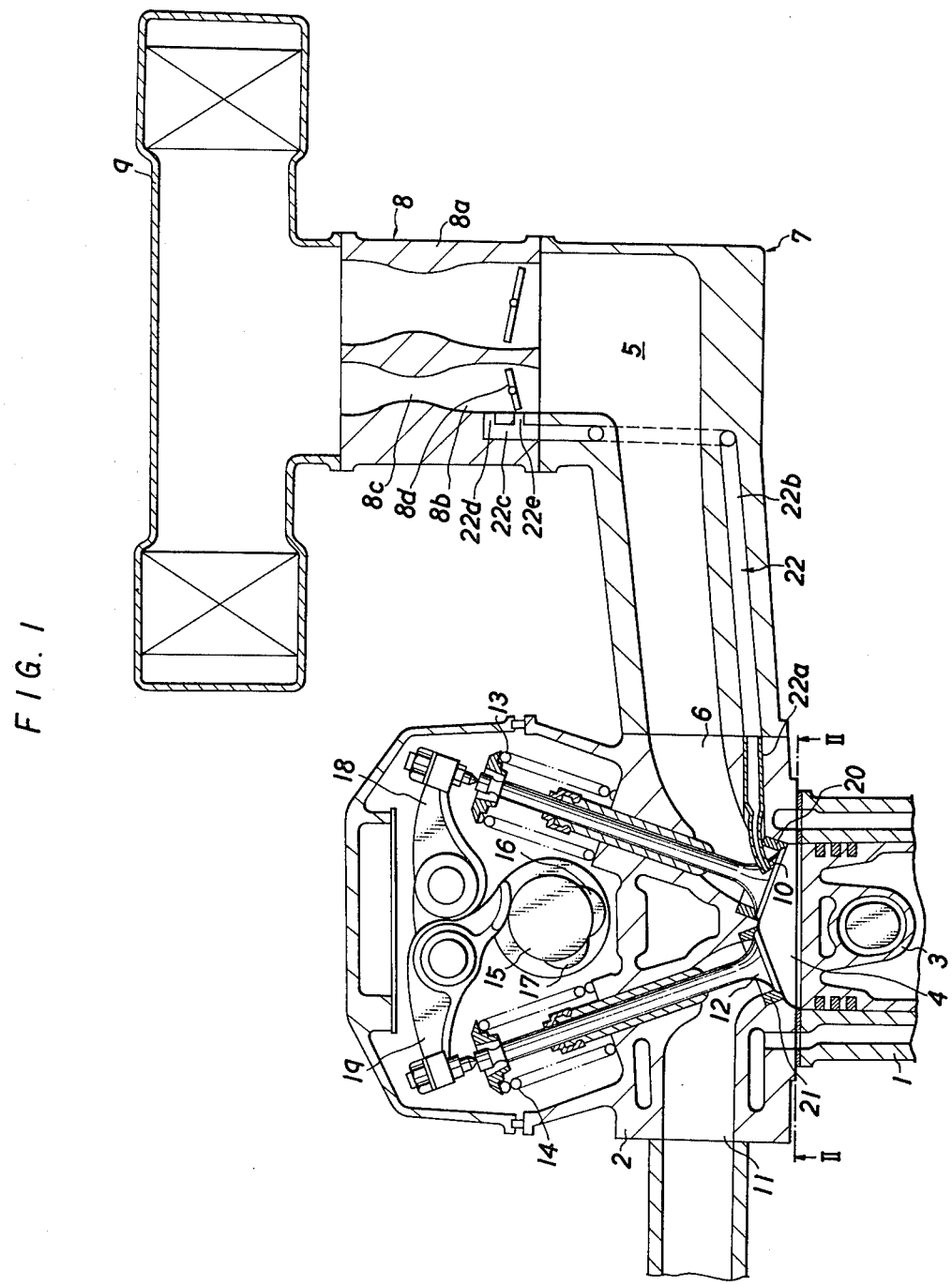
FIG. 1 is a wholly sectional view showing one embodiment of the present invention.
Figure 2:
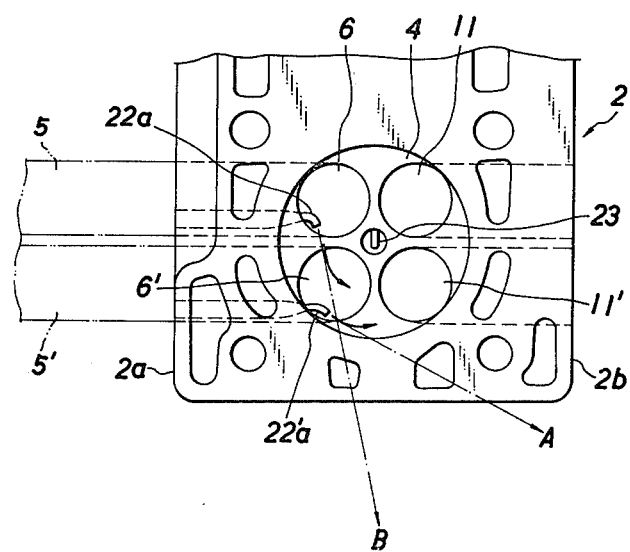
FIG. 2 is a view of a cylinder head taken along Line II—II of FIG. 1.

The present invention will now be described in connection with the embodiment thereof with reference to the accompanying drawings. In FIG. 1, there is shown an internal combustion engine of the present invention comprising a cylinder 1, a cylinder head 2 and a piston 3, respectively. That portion of the engine shown has a single combustion chamber 4 into which two main suction paths 5, 5' are independently opened, as shown in FIG. 2. Each of the main suction paths 5, 5' is constructed, as shown in FIG. 1, into a serial passage which leads from a suction port 6 formed in the cylinder head 2 via a suction manifold 7 and a two-barrel carburetor 8 acting as a fuel supply device, to an air cleaner 9. The open portions of the two suction ports 6, 6' into the combustion chamber are so juxtaposed as are shown in FIG. 2.

The outlet end of each suction port 6, 6', i.e., the open portion or end into the combustion chamber 4 is equipped with a suction valve 10, by which the suction port 6 is opened or closed. Into the single combustion chamber 4, on the other hand, there are opened two exhaust ports 11, 11' which are formed in the cylinder head 2 and which are opened or closed by two exhaust valves 12, 12' respectively. Both the valves 10 and 12 are opened or closed by the action of a control mechanism, which is constructed of return springs 13 and 14, cams 16 and 17 driven by a cam shaft 15, and rocker arms 18 and 19 and so on, so that they are seated upon their respective valve seats 20 and 21 when they are closed.

The two suction ports 6, 6' and the two exhaust ports 11, 11' for the aforementioned single combustion chamber 4 are, in the embodiment being described, of a kind of transverse types, in which the two suction ports 6, 6' are juxtaposed to each other along one side end face 2a of the cylinder head 2 whereas the two exhaust ports 11, 11' are juxtaposed to each other along the other side end face 2b of the same cylinder head 2. Moreover, an ignition plug 23 is arranged at the center of the combustion chamber 4.

A sub-suction path 22 having a smaller effective opening area that that of the main suction paths 5, 5' is provided for each main suction path 5, 5' (i.e., for each suction valve 6, 6'), i.e., of the same number as that of the main suction paths 5, 5' for the single combustion chamber 4. Each of the sub-suction paths such as the path 22, in the embodiment, is constructed of an injection nozzle pipe 22a which is press-fitted in the cylinder head 2; a passage portion 22b which is formed in the suction manifold 7; and a path 22c which is formed in the body 8a of the carburetor 8. The path 22c is branched to form two inlet ends 22d and 22e which are opened into the primary draft passage 8b of the carburetor 8. Both the two inlet ends 22d and 22e are spaced in the flow direction of a draft passage 8b. Specifically, the upstream side inlet end 22d is opened between the primary venturi portion 8c and the primary throttle valve 8d of the carburetor 8 whereas the downstream side inlet end 22e is opened at such a position as is opened or closed by the primary throttle valve 8d such that it is closed by the primary throttle valve 8d when the latter is at its closed (i.e., idling) position.

On the other hand, each injection nozzle pipe 22a comprising the outlet end portion of each sub-suction path is made to have its lead end diameter reduced as a nozzle portion such that it is opened immediately upstream of the corresponding suction valve 10. Moreover, this injection nozzle pipe 22a is directed toward the combustion chamber 4 so that a swirl of the suction gases which turns centering around the axis of the cylinder 1 may be generated in the combustion chamber 4. The two injection nozzle pipes 22a provided for the single combustion chamber 4 are so pointed with respect to each other that the swirls of the suction gas in an identical direction, which turns centering around the axis of the cylinder 1, are generated in the combustion chamber 4. Nevertheless, their pointing directions are made different from each other, as indicated at different arrows A and B in FIG. 2. Of those two injection nozzle pipes 22a and 22'a, more specifically, the pipe 22a positioned upstream of the suction swirl is directed toward the open portions of both the injection nozzle pipe 22a, which is positioned downstream of the upstream-positioned pipe 22a, and the suction port 6, which is positioned downstream of the downstream-positioned pipe, into the combustion chamber 4.

The two injection nozzle pipes 22a, 22'a thus provided for the single combustion chamber 4 may be modified such that they are made to merge midway into each other until they communicate with the path 22b or such that they are made to merge into the injection nozzle pipes 22a, 22'a which are provided for the combustion chamber of another cylinder, until they communicate with the path 22b. In short, the upstream side constructions of the sub-suction paths 22 can be suitably modified in accordance with the number of the carburetors, the existence of the suction manifold and so on. Needless to say, the open positions and number of the inlet ends of the sub-suction paths 22, 22' can be suitably selected, too.

The exhaust gas is recirculated from the exhaust-line passages via one or more EGR valves (not shown) to either the main suction paths 5 or the sub-suction paths 22. Nevertheless, the constructions of the EGR passage or passages and the EGR valve or valves can be made similar to those of the prior art, and are therefore omitted from the drawings.

In the internal combustion engine of the present invention, during the suction stroke having the suction valves 10, 10' opened, the combustion chamber 4 is supplied with an air-fuel mixture from the main suction paths 5, 5' whereas a gas is sucked and injected from the sub-suction paths 22, 22' into the combustion chamber 4. By the injection of the gas from those sub-suction paths 22, 22', the mixture sucked into the combustion chamber 4 is swirled turning centering around the axis of the cylinder 1 so that the burning velocity is accelerated.

According to the present invention, since the pointing directions of the two injection nozzle pipes 22a, 22'a provided for the single combustion chamber 4 are made different from each other, for example, the improvement of the homogenization of the mixture by the stirring action or the generation of an intense swirl substantially all over the area in the radial direction of the cylinder 1 can be effected without any difficulty thereby to remarkably contribute to the improvement in the combustion.

Incidentally, three or more suction ports such as the ports 6, 6' and one or three or more exhaust ports can be provided for the single combustion chamber 4.

Although, in the embodiment thus far described, the sub-suction paths 22, 22' are opened immediately upstream of the suction valves 10, 10', the present invention should not be limited to such construction but may be modified such that the sub-suction paths are opened directly into the combustion chamber 4 and such that either the open portions of those sub-suction paths into the combustion chamber 4 or their adjacent portions are opened or closed by means of valves which are different from the suction valves 10. Moreover, although the inlet end 22d of each sub-suction paths 22 is opened between the primary throttle valve 8d and the primary venturi portion 3c, it may be opened either upstream of the primary venturi portion 8c or into the air cleaner 9.

Although the foregoing embodiment is directed to the example in which the present invention is applied to the multi-cylinder engine, the present invention can also be applied to a single-cylinder engine.

As has become apparent from the foregoing description, according to the present invention, since the combustion can be remarkably improved, the purification of the engine exhaust gas and the fuel economy can be performed in a high power engine in which a single combustion chamber is equipped with a plurality of suction valves.

Furthermore, since the sub-suction paths are opened immediately upstream of the suction valves for opening or closing the main suction paths, according to the present invention, the opening or closing operations of the main and sub-suction paths can be effected by an identical suction valve.

According to the present invention, furthermore, since the outlet port of the sub-suction path positioned upstream of the suction swirl source is directed toward the open portion of such a main suction path into the combustion chamber as is positioned downstream of the suction swirl source, the mixture to be injected into the combustion chamber from the main suction path positioned downstream of the suction swirl source can be more effectively directed circumferentially of the combustion chamber.

According to the present invention, furthermore, since the outlet port of the sub-suction path positioned upstream of the suction swirl source is directed toward the outlet port of the sub-suction path positioned down stream of the intake swirl source, the suction swirl can be more effectively generated.

What is claimed is:

1. An internal combustion engine comprising:
   A. a combustion chamber defined by a cylinder head, a cylinder attached to said cylinder head and a piston operably mounted within said cylinder and adapted to make both compression strokes and suction strokes; and
   B. a carburetor adapted to mix fuel with air to produce an air-fuel mixture and adapted to provide said air-fuel mixture to the combustion chamber; and
   C. a main suction path, through which the air-fuel mixture is provided to the combustion chamber, terminating in two suction valves, said suction valves opening into said combustion chamber; and D. two sub-suction paths provided in the main suction path, a first sub-suction path terminating in a first nozzle and a second sub-suction path terminating in a second nozzle, said first and second nozzles opening into the combustion chamber in a direction tangential to the axis of the cylinder;

wherein the first nozzle and the second nozzle are oriented, with respect to one another, such that gases passing through the first nozzle and gases passing through the second nozzle produce swirls of gases in the combustion chamber in an identical direction, said swirls centering around the axis of the cylinder.

2. An internal combustion engine comprising:
A. a combustion chamber defined by a cylinder head, a cylinder attached to said cylinder head and a piston operably mounted within said cylinder and adapted to make both compression strokes and suction strokes; and
B. two main suction paths opening independently into said combustion chamber, each of said main suction paths being constructed as a serial passage leading from a suction port formed in the cylinder head through a suction manifold and a two-barrel carburetor to an air cleaner, wherein each of said suction ports is equipped with a suction valve by which the suction port is opened and closed; and
C. two sub-suction paths, one provided in each of said main suction paths, having a smaller effective opening area than that of the main suction paths, said sub-suction paths comprising: an injection nozzle press-fitted in the cylinder head, a passage portion formed in the suction manifold and a path formed in the carburetor;

wherein, the injection nozzle comprises the outlet portion of the corresponding sub-section path; and wherein, each injection nozzle is directed toward the combustion chamber such that a swirl of suction gases which turns centering around the axis of the cylinder is generated in the combustion chamber; and wherein the two injection nozzles are oriented with respect to one another such that the swirls of suction gases generated by the injection nozzles are in an identical, circumferential direction having turns centering around the axis of the cylinder.

3. An internal combustion engine comprising:
a plurality of main suction paths respectively independently opened into a single combustion chamber provided with a piston capable of performing a suction stroke, respectively connected with a fuel supply device and adapted to be opened and closed by independent and respective suction valves; and
a plurality of sub-suction paths, provided seperately of said main suction paths, each having an outlet port pointed into said combustion chamber in an identical circumferential direction, so as to generate a swirl of suction gas in said single combustion chamber during the suction stroke.

4. An internal combustion engine of claim 3, wherein said sub-suction paths are opened into at least one of said plural main suction paths at a position immediately upstream of the corresponding suction valves.

5. An internal combustion engine of claim 3, wherein the plural sub-suction paths are the same in number as said main suction paths; wherein the open portions of said main suction paths to the combustion chamber are juxtaposed to one another and are so disposed that they are respectively opened and closed by the corresponding suction valves, and wherein said sub-suction paths are respectively opened immediately upstream of the suction valves of the corresponding main suction paths.

* * * * *